United States Patent [19]

Takada et al.

[11] Patent Number: 5,498,495
[45] Date of Patent: Mar. 12, 1996

[54] ALLOY FOR NEGATIVE ELECTRODE OF LITHIUM SECONDARY BATTERY AND LITHIUM SECONDARY BATTERY

[75] Inventors: Yoshinori Takada; Mitsuhiro Marumoto, both of Amagasaki; Kouzou Sasaki, Tokyo, all of Japan

[73] Assignee: Mitsubishi Cable Industries, Ltd., Hyogo, Japan

[21] Appl. No.: 392,217

[22] Filed: Feb. 22, 1995

[30]  Foreign Application Priority Data

Feb. 22, 1994 [JP] Japan .................................. 6-049869
Apr. 28, 1994 [JP] Japan .................................. 6-113683

[51] Int. Cl.$^6$ ........................................... H01M 4/40
[52] U.S. Cl. ........................ 429/219; 429/218; 420/400
[58] Field of Search ............................. 429/218, 219; 420/400

[56]  References Cited

U.S. PATENT DOCUMENTS

| | | | |
|---|---|---|---|
| 1,695,687 | 12/1928 | Holborn | 420/400 |
| 1,869,494 | 7/1930 | Osborg | 420/400 |
| 2,577,289 | 6/1950 | Tiganik | 429/218 |
| 4,316,777 | 2/1982 | Dey | 429/219 |
| 4,626,335 | 12/1986 | Cupp et al. | 429/218 |
| 4,808,499 | 2/1989 | Nagai et al. | 429/218 |
| 4,818,645 | 4/1989 | Harris et al. | 429/218 |
| 4,824,746 | 4/1989 | Belanger et al. | 429/218 |
| 4,844,994 | 7/1989 | Koshiba et al. | 429/218 |
| 5,162,170 | 11/1992 | Miyabayshi et al. | 429/218 |
| 5,283,136 | 2/1994 | Peled et al. | 429/218 |
| 5,284,721 | 2/1994 | Beard | 429/194 |

OTHER PUBLICATIONS

Patent Abstracts of Japan, vol. 010, No. 170, (E–412) Jun. 17, 1986; & JP–A–61 022567, Jan. 31, 1986.
Patent Abstracts of Japan, vol. 017, No. 340 (E–1389), Jun. 28, 1993; & JP–A–05 047381, Feb. 26, 1993.
Patent Abstracts of Japan, vol. 013, No. 317 (E–789), Jul. 19, 1989; & JP–A–01 086455, Mar. 31, 1989.
Patent Abstracts of Japan, vol. 013, No. 317 (E–789), Jul. 19, 1989; & JP–A–01 086454, Mar. 31, 1989.
Patent Abstracts of Japan, vol. No. 013, No. 317 (E–789), Jul. 19, 1989; & JP–A–01 086453, Mar. 31, 1989.
Database WPI, Derwent Publications Ltd., London, GB; AN 95–095088 & JP–A–07 022 017, Jan. 24, 1995.

*Primary Examiner*—Stephen Kalafut
*Assistant Examiner*—Carol Chaney
*Attorney, Agent, or Firm*—Wenderoth, Lind & Ponack

[57] ABSTRACT

An alloy for a negative electrode of a lithium secondary battery, comprising an Li-Ag-Te type alloy having an atomic ratio of Li:Ag:Te=15–120:1–20:0.001–2, an alloy for a negative electrode of a lithium secondary battery, comprising an Li-Ag-Te-(M1–M2) type alloy having an atomic ratio of Li:Ag:Te:M1:M2=15–120:1–20:0.001–2:1–50:1–30 wherein M1 is a 3A–5A group metal and M2 is a transition metal other than Ag, and a lithium secondary battery comprising a negative electrode composed of the above-mentioned alloy. According to the present invention, a negative electrode, wherein the growth of dendrite is suppressed, charge-discharge capacity is high, energy density is high and degradation due to repetitive charge-discharge is less, can be obtained. By the use of the negative electrode obtained in the present invention, moreover, a lithium secondary battery superior in charge-discharge cycle life, which has high energy density permitting long-term use, high electromotive force and high charge-discharge capacity, can be produced.

8 Claims, 1 Drawing Sheet

ALLOY FOR NEGATIVE ELECTRODE OF LITHIUM SECONDARY BATTERY AND LITHIUM SECONDARY BATTERY

FIELD OF THE INVENTION

The present invention relates to an alloy for the negative electrode of lithium secondary battery which is highly powerful and superior in charge and discharge cycle life, and to a lithium secondary battery using said alloy.

BACKGROUND ART

There have been conventionally known nonaqueous electrolyte solution type lithium secondary batteries using a nonaqueous electrolyte solution, such as an organic solvent, as an electrolyte solution and pure Li for a negative electrode. The use of a nonaqueous electrolyte solution and pure Li aims at achieving battery power having high energy density and high electromotive force. However, such batteries are associated with problems in that dendrite (branch-like crystals) easily grow on the surface of the pure Li negative electrode due to the electrodeposition caused by the discharge reaction between the negative electrode and Li ions at the time of charging. The growth of the dendrite markedly degrades the battery function, as well as short-circuits the positive and negative electrodes by penetrating a separator (electrolyte solution layer) to ultimately result in poor charge-discharge cycle life.

In an attempt to solve such problems, it has been proposed to form a negative electrode from an Li alloy comprising an intermetallic compound of Al, Bi, Pb, Sn, In etc. and Li. According to this method, the growth of dendrite is suppressed by decreasing the speed of discharge reaction between the negative electrode and Li ions. The decreased speed of discharge reaction is achieved by increasing the electrode potential of pure Li by alloying, thereby lowering the activity of the negative electrode. However, this also poses problems in that the lowered activity of the negative electrode by alloying also lowers electromotive force and charge-discharge capacity, and in that the negative electrode develops cracks through expansion and contraction in volume for absorption and discharge of Li during charge-discharge cycles, since the alloying makes the electrode fragile, and the negative electrode ultimately becomes pulverulent, thereby shortening the service life of the battery.

There has also been proposed a negative electrode formed from a dilute solid solution alloy comprising Mg, Ag, Zn etc. added to Li, for achieving high electromotive force and high charge-discharge capacity. However, the negative electrode formed from such dilute solid solution alloy does not differ significantly from the surface of pure Li in terms of electrochemical properties, since the aforementioned alloy components are sprinkled in the metal crystal matrix of Li, and the electrode is susceptible to dendrite growth during charging, like pure Li negative electrode. This type of lithium secondary battery is less practical due to its short charge-discharge cycle life.

It is therefore an object of the present invention to provide an alloy for lithium secondary battery negative electrode exhibiting high charge-discharge capacity, high energy density and less degradation due to the repetitive charge-discharge cycles, and a lithium secondary battery having high electromotive force, high charge-discharge capacity, high battery power of high energy density, and superior charge-discharge cycle life.

SUMMARY OF THE INVENTION

With the aim of achieving the object of the invention, the present inventors have found that a negative electrode formed from an Li alloy having a specific composition can achieve the object, and completed the invention.

Accordingly, the present invention relates to an alloy for lithium secondary battery negative electrode, comprising an Li-Ag-Te type alloy having a composition based on an atomic ratio of Li:Ag:Te=15–120:1–20:0.001–2.

The present invention also relates to an alloy for lithium secondary battery negative electrode, comprising an Li-Ag-Te-(M1–M2) type alloy having a composition based on an atomic ratio of Li:Ag:Te:M1:M2= 15–120:1–20:0.001–2:1–50:1–30, wherein M1 is a 3B–5B with 3A–5A of the periodic chart used in the United States group metal and M2 is a transition metal other than Ag.

The present invention also relates to an alloy for lithium secondary battery negative electrode wherein M1 is one or more kinds selected from Al, Si, In and Sn; and M2 is one or more kinds selected from Zn, Fe, Co, Ni, Mn, Mo and W.

The present invention further relates to a lithium secondary battery comprising a negative electrode comprising the above-mentioned alloy for lithium secondary battery negative electrode.

DETAILED DESCRIPTION OF THE INVENTION

Figure 1:
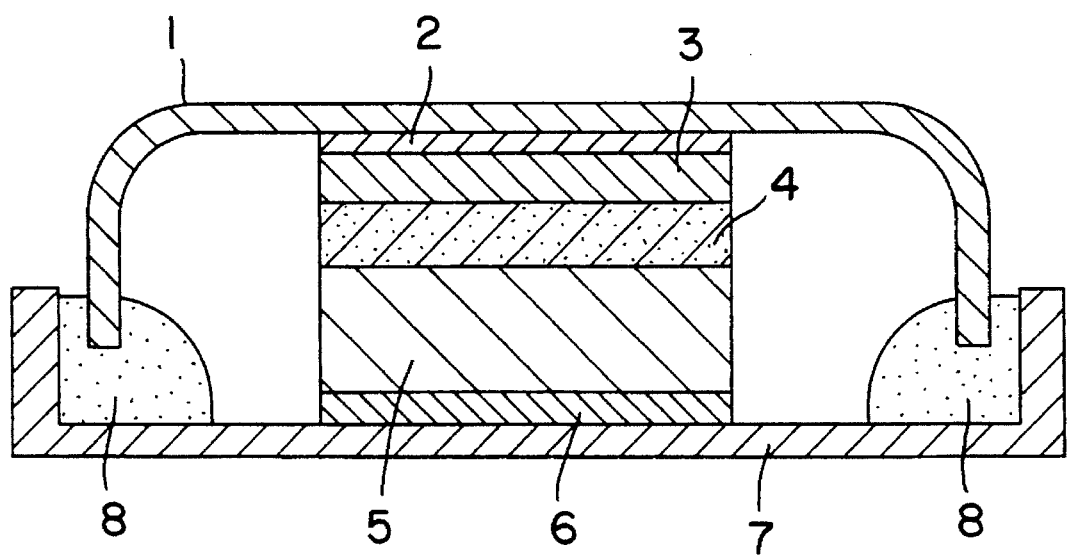
FIG. 1 shows one embodiment of the lithium secondary battery of the present invention.

The Li-Ag-Te type alloy to be used for the lithium secondary battery negative electrode in the present invention comprises an Li-Ag type alloy which absorbs and discharges Li during charging and discharging, and an intermetallic compound fine particles, such as $Ag_2Te$ and $Li_2Te$, which realize fine division of crystals to promote diffusion of Li and Ag.

Said Li-Ag-Te type alloy has a $\gamma_1$-phase which can be seen in Li-Ag type alloys, and the present inventors have found that a greater number of the $\gamma_1$-phases contribute to the retention of discharge capacity over an extended period of time, as well as improved charge-discharge cycle life. In other words, the $\gamma_1$-phase contains numerous vacancies due to the defect structure and promotes diffusion of Li and Ag. Accordingly, the $\gamma_1$-phase quickly brings the changing electrode composition, which is associated with Li absorption and discharge, to an end by synergistic action with the Li and Ag diffusion-promoting effect achieved by Te by finely dividing crystals, so that the reversibility of charge-discharge reaction is improved. Consequently, discharge capacity can be retained over an extended period of time and charge-discharge cycle life is extended. Hence, it is particularly preferable that the alloy of the present invention contain $\gamma_1$-phase in a large number.

Te finely divides crystal particles by forming a multitude of crystal nuclei to increase grain boundary area during a solidification step in forming an intermetallic compound having a high melting point, which is composed of a reaction product of the aforementioned Li and Ag, and Te; namely, a melt-forming process of an Li-Ag-Te type alloy. The diffusion speed of Li in the grain boundary is not less than several dozens times as great as the transgranular speed thereof. As such, the increased grain boundary area leads to an accelerated diffusion of Li, which is a rate-determining factor in the Li electrodeposition on the negative electrode, thereby decreasing occurrence of dendrite. The accelerated diffusion of Li also results in an enhanced efficiency of Li absorption and discharge.

A lithium secondary battery having improved charge-discharge cycle life can be obtained by using a negative electrode formed from an Ag-containing negative electrode alloy which has the aforementioned composition and which comprises Te at a lower concentration.

Note that an Li-Ag-Te type alloy containing Te at a high concentration (e.g. not less than 5 in atomic ratio of Te) can also realize, like the alloy of the present invention, which contains Te at a lower concentration, advantageous properties such as greater Li absorption performance, suppression of dendrite growth during charging over a wide current density region, low electrode potential equal to that of pure Li, and high electromotive force afforded thereby. However, the alloy of the present invention, which contains Te at a lower concentration, is far superior in the prevention of gradual decrease in charge-discharge capacity during continuous charge-discharge cycle over an extended period of time; namely, in terms of charge-discharge cycle life and retention of initial charge-discharge capacity.

One of the reasons for the above-mentioned phenomenon is considered to be degradation of properties of negative electrode surface due to the segregation and agglutination of the aforementioned intermetallic compound in an alloy containing Te at a high concentration. That is, when the Te concentration in the alloy for the negative electrode is high, segregation and agglutination of the Te intermetallic compound proceeds during long-term charge-discharge cycles, and macro accumulation additionally proceeds on the surface of the negative electrode to degrade the properties of the negative electrode surface. When Te is contained at a high concentration, therefore, diffusion of Li and Ag near the negative electrode surface is inhibited by the macro segregation and agglutination of the aforementioned intermetallic compound on the negative electrode surface, and charge-discharge property becomes poor due to the progressively occurring non-uniform current density distribution on the negative electrode surface. On the other hand, when Te is contained at a low concentration, the above-mentioned segregation and agglutination are suppressed, and a crystalline structure superior in diffusion of Li is formed.

The aforementioned segregated substance easily causes cracks in the negative electrode during a winding step for forming the negative electrode in a sheet shape to be mentioned below, and the portions which have developed cracks tend to cause damages to a separator. Accordingly, suppression of such segregation is advantageous in forming a high performance lithium secondary battery and a negative electrode therefor.

An (M1–M2) type alloy component may be contained, besides the above-mentioned Li-Ag-Te type alloy component, in the alloy for lithium secondary battery negative electrode of the present invention.

As mentioned above, the Li-Ag-Te type alloy component accelerates diffusion of lithium and smoothly absorbs and discharges lithium during charging and discharging.

The (M1–M2) type alloy component is an intermetallic compound which is stable per se and suppresses, by the binder effect of the intermetallic compound, degradation of negative electrode due to expansion and contraction in volume for the absorption and discharge of lithium, thereby ultimately contributing to the prevention of shortened cycle life of the battery.

M1 is a 3A, 4A or 5A group metal in the periodic table (long period used in the United States), and one or more members may be used in combination. M1 is preferably one or more members selected from Al, Si, In and Sn, with more preference given to one or more members selected from Si, In and Sn.

M2 is a transition metal other than Ag [3B–7B, 8, 1B or 2B group metal in the periodic table (long period used in the United States)], and one or more members may be used in combination. M2 is preferably one or more members selected from 2n, Fe, Co, Ni, Mn, Mo and W, with more preference given to one or more members selected from Zn, Fe and Ni.

The alloy for the lithium secondary battery negative electrode of the present invention comprises an Li-Ag-Te type alloy having a composition based on the atomic ratio of Li:Ag:Te=15–120:1–20:0.001–2, with preference given to an Li-Ag-Te-(M1–M2) type alloy having a composition based on the atomic ratio of Li:Ag:Te:M1:M2= 15–120:1–20:0.001–2:1–50:1–30.

When the atomic ratio of Li is less than 15, the diffusion speed of Li and Ag decreases and sufficient electromotive force cannot be obtained. In addition, the alloy tends to show poor processability. When the atomic ratio of Li exceeds 120, the electrochemical properties of the alloy become closer to those of pure Li electrode and occurrence of dendrite is not sufficiently suppressed. Preferable atomic ratio of Li is 15–100, preferably 15–90 and particularly preferably 15–80.

When the atomic ratio of Ag is less than 1, the $\gamma_1$-phase is associated with difficulty in forming, and the electrochemical properties of the negative electrode surface become closer to those of pure Li electrode. When the atomic ratio of Ag exceeds 20, the diffusion speed of Li and Ag decreases and processing of the alloy into a sheet becomes difficult. In addition, the electromotive force tends to decrease. Preferable atomic ratio of Ag is 2–18, preferably 5–18 and particularly preferably 6–13.

When the atomic ratio of Te is less than 0.001, its effect of finely-dividing crystals, which promotes diffusion of Li and Ag, becomes poor. When the atomic ratio of Te exceeds 2, the segregation of the intermetallic compound easily proceeds. Preferable atomic ratio of Te is 0.002–1.999, preferably 0.005–1.0 and particularly preferably 0.005–0.05.

The atomic ratio of M1 is preferably 1–50 and that of M2 is preferably 1–30. When the atomic ratios of M1 and M2 are within the above-mentioned range, sufficient binder effect can be obtained, and when manufactured into a battery, superior charge-discharge cycle life, high charge-discharge capacity, high electromotive force and high energy density can be achieved. The atomic ratio of M1 is more preferably 2–30, particularly preferably 5–20 and that of M2 is more preferably 1–20, particularly preferably 1–10.

The alloy (Li-Ag-Te type alloy or Li-Ag-Te-(M1–M2) type alloy) for the lithium secondary battery negative electrode of the present invention can be formed by a known, suitable alloying method, such as the melting method wherein predetermined amounts of respective alloy components are melted and reacted, and a method including reaction by evaporation.

According to the melting method, the alloy components are heated and melted under an inert gas atmosphere to give an alloy. The components are preferably heated to a temperature not less than the melting point of Li, at which temperature alloying reaction proceeds speedily.

According to the evaporation alloying, the alloy components are evaporated and solidified on the surface of a conductor composed of other kinds of metal. The method for evaporation includes, for example, various sputtering methods such as ion beam sputtering, electron beam evaporation, various ion plating methods, flash plasma evaporation method, pulse plasma evaporation method, CVD (Chemical Vapor Deposition) and the like, which can be used as appropriate.

The method for forming the negative electrode for lithium secondary battery is not particularly limited and the electrode can be formed by a conventional method. For example, a previously-formed alloy for negative electrode is appropriately processed into a known negative electrode shape such as sheet, tape, thin film, substrate plate and the like, which are hereinafter generally referred to as sheet shape.

Specific examples thereof include a method for processing a negative electrode alloy into a sheet by hot rolling, hot extrusion or the like, and a method for forming a negative electrode alloy layer on a collector by hot dipping or vacuum plasma spraying. The latter method using a collector is advantageous in forming a sheet-shaped negative electrode and an alloy layer can be formed on one or both sides of the collector.

The hot rolling comprises heating the alloy materials for good processability and press-rolling the material, and the hot extrusion comprises heating the alloy materials for good processability and extruding the material. The hot dipping comprises melting the alloy in an argon gas and immersing a collector therein for plating, and the vacuum plasma spraying comprises spraying a molten alloy on a collector under a reduced pressure argon atmosphere (e.g. 100 m Torr).

A sheet-shaped negative electrode can be also formed by, for example, setting a negative electrode alloy onto a collector sheet by the aforementioned evaporation.

In addition, a sheet-shaped negative electrode alloy may be bonded to a collector sheet by a suitable method such as brazing, soldering, ultrasonic welding and spot welding, whereby a laminate of a negative electrode alloy sheet and a collector sheet is formed.

The method for forming a negative electrode made of an Li-Ag-Te-(M1–M2) type alloy includes, besides the above-mentioned, a method comprising applying to or evaporate-depositing on a collector sheet a suitable amount of an (M1–M2) type alloy powder and subjecting the collector sheet to heat treatment, followed by spraying, impregnating with or immersing in an Li-Ag-Te type alloy. These steps are preferably performed under an inert gas atmosphere so that degradation of respective constituent materials can be prevented.

The collector sheet refers to a sheet-shaped collector composed of suitable conductors such as Ni, Al, Cu, Ag and Fe. Specific examples thereof include metal foil sheet, metal mesh sheet and metal porous sheet.

The structure and production method of the lithium secondary battery of the present invention are known except the use of a negative electrode made of the aforementioned alloy for lithium secondary battery negative electrode.

In FIG. 1, one embodiment (coin type) of the lithium secondary battery of the present invention is exemplified, wherein 1 and 7 are battery cans, 2 and 6 are Ni plate collectors, 3 is a negative electrode, 4 is a separator (electrolyte solution layer), 5 is a positive electrode and 8 is an insulation sealant.

The positive electrode of the lithium secondary battery may be formed from a positive electrode material comprising, as an active material, $MnO_2$, $LiCoO_2$, $Li_wCo_{1-x-y}M_xP_yO_{2+z}$ wherein M is one or more members of transition metals, $0<w\leq 2$, $0\leq x<1$, $0<y<1$ and $-1\leq z\leq 4$, or a substance comprising at least one kind selected from phosphate of Li, phosphate of Li.Co, oxide of Co and oxide of Li.Co in a proportion of not less than 0.1 mole of Co and not less than 0.2 mole of P per mole of Li.

The sheet-shaped positive electrode can be formed, for example, by a suitable method, such as casting, compression molding, roll forming, doctor blade method and the like, together with, where necessary, conductivity-imparting agent (e.g. acetylene black and ketzen black) and binder [e.g. polytetrafluoroethylene, poly(vinylidene fluoride) and polyethylene]. As the solvent for the binder, N-methylpyrrolidone, propylene carbonate and the like may be used. As in the case of negative electrode, a positive electrode material may be bonded to a collector sheet as appropriate.

A nonaqueous electrolyte solution and solid electrolyte may be used as an electrolyte for lithium secondary battery.

The nonaqueous electrolyte solution can be prepared by dissolving salts such as Li salt in a suitable organic solvent such as propylene carbonate, ethylene carbonate, dimethyl carbonate, diethyl carbonate, tetrahydrofuran, 2-methyltetrahydrofuran, dimethyl sulfoxide, sulfolane, γ-butyrolactone, 1,2-dimethoxyethane, diethyl ether, 1,3-dioxolane, methyl formate, methyl acetate, N,N-dimethylformamide, acetonitrile and mixtures thereof, and dissolving organic additives such as 2-methylfuran, thiophene, pyrrole and crown ether as necessary.

Examples of Li salt include $LiClO_4$, $LiBF_4$, $LiPF_4$, $LiAsF_3$, $LiAlCl_4$, $Li(CF_2SO_2)_2$, $LiI$ and $LiCF_3SO_3$. The concentration of Li salt in the electrolyte solution is generally 0.1–3 moles/l, which is not limitative.

Examples of the solid electrolyte include those prepared by mixing salts such as the aforementioned Li salt with a salt electrolytic polymer such as polyethylene oxide, polyphosphazene, polyaziridine, polyethylene sulfide, derivatives thereof, mixtures thereof and complexes thereof.

When the aforementioned nonaqueous electrolyte solution is used as an electrolyte, a separator to be interposed between the positive and negative electrodes is formed by a suitable conventional method such as impregnating or filling a porous polymer film, glass filter, nonwoven fabric and the like with said electrolyte solution. When the aforementioned solid electrolyte is used as an electrolyte, it advantageously also functions as a separator between the positive and negative electrodes.

Examples of battery can include Ni-plated iron, Cr-plated iron and stainless, with preference given to Ni-plated iron.

Examples of insulating sealant include polypropylene, polyethylene and nylon, with preference given to polypropylene.

The shape of the lithium secondary battery can be determined as appropriate according to the object of use, and can be a coin type, button type or winding type. In a secondary battery of the coin type, button type or winding type, sheet-shaped negative electrode and positive electrode are preferably used.

The method for producing the lithium secondary battery is not particularly limited and the battery can be manufactured by a known method. For example, a winding type lithium secondary battery can be manufactured by winding a negative electrode and a positive electrode with a separator interposed between the two electrodes, housing same in a battery can, injecting an electrolyte solution and applying an insulation sealant at the edge of the battery can. The coin type and button type lithium secondary batteries can be manufactured in the same manner as above except that a negative electrode and a positive electrode are housed in a battery can without winding the two electrodes with a separator interposed therebetween.

The lithium secondary battery thus obtained is charged by continuous application of a constant current, application of pulse current from a pulse power supply or other suitable method. The charging with pulse current is advantageous in that changes in concentration can be suppressed by repetitive application and suspension of the current, thereby making dendrite difficult to develop.

The present invention is described in more detail by way of Examples, to which the invention is not limited.

EXAMPLE 1

An Li-Ag-Te type alloy having an atomic ratio of Li:Ag:Te=90:10:1, which had been formed by the melting method, was heat-melted at 300° C. A collector sheet (13 μm thickness, 41 mm width, 300 mm length) was immersed in the molten solution and pulled out to give a negative electrode tape having a 14 μm thick Li-Ag-Te type alloy layer on the both sides of the collector sheet. The collector sheet had been prepared by forming a 0.5 μm thick Ni plating layer and thereon a 1 μm thick Ag plating layer on both sides of a 10 μm thick Cu tape and the sheet was superior in heat resistance and wettability with the aforementioned molten solution of the alloy.

Alongside therewith, lithium carbonate, basic cobalt carbonate and a 85% aqueous phosphoric acid solution were mixed in an atomic ratio of Li:Co:P=2:1.5:0.5. The mixture was placed in an alumina crucible and heated at 900° C. for 24 hours to give a mixture (active substance) of phosphate of lithium, phosphate of lithium—cobalt, and cobalt oxide. The mixture was pulverized in a ball mill to give a powder having a particle size of not more than 20 μm. Then, said powder (46 parts by weight), acetylene black (4 parts by weight), poly(vinylidene fluoride) (2 parts by weight), and N-methylpyrrolidone (50 parts by weight) were mixed and applied on an aluminum tape (38 mm width, 240 mm length, 20 μm thickness) by the doctor blade method and dried in vacuo to form a 150 μm thick coating layer (positive electrode layer), which was used as a positive electrode tape.

The aforementioned negative electrode tape and the positive electrode tape were wound with a 30 μm thick porous polypropylene film (separator) interposed between them, and housed in a battery can. An electrolyte solution (3 ml) was injected to give a size AA secondary battery. The electrolyte solution was prepared by dissolving 1 mole of LiClO$_4$ in 1 l of propylene carbonate.

EXAMPLE 2

A negative electrode tape and a lithium secondary battery were obtained in the same manner as in Example 1 except that an Li-Ag-Te type alloy having an atomic ratio of Li:Ag:Te=90:10:0.1 was used.

EXAMPLE 3

A negative electrode tape and a lithium secondary battery were obtained in the same manner as in Example 1 except that an Li-Ag-Te type alloy having an atomic ratio of Li:Ag:Te=90:10:0.01 was used.

EXAMPLE 4

A negative electrode tape and a lithium secondary battery were obtained in the same manner as in Example 1 except that an Li-Ag-Te type alloy having an atomic ratio of Li:Ag:Te=95:5:1 was used.

EXAMPLE 5

A negative electrode tape and a lithium secondary battery were obtained in the same manner as in Example 1 except that an Li-Ag-Te type alloy having an atomic ratio of Li:Ag:Te=95:5:0.1 was used.

EXAMPLE 6

A negative electrode tape and a lithium secondary battery were obtained in the same manner as in Example 1 except that an Li-Ag-Te type alloy having an atomic ratio of Li:Ag:Te=95:5:0.01 was used.

EXAMPLE 7

A negative electrode tape and a lithium secondary battery were obtained in the same manner as in Example 1 except that an Li-Ag-Te type alloy having an atomic ratio of Li:Ag:Te=85:15:1 was used.

EXAMPLE 8

A negative electrode tape and a lithium secondary battery were obtained in the same manner as in Example 1 except that an Li-Ag-Te type alloy having an atomic ratio of Li:Ag:Te=85:15:0.01 was used.

EXAMPLE 9

A lithium secondary battery was obtained in the same manner as in Example 1 except that a 20 μm thick layer of an Li-Ag-Te type alloy having an atomic ratio of Li:Ag:Te=90:10:0.2 was formed by vacuum plasma spraying on both sides of a collector sheet to give a negative electrode tape. The vacuum plasma spraying was performed under a 100 m Torr highly pure argon atmosphere.

Comparative Example 1

A negative electrode tape and a lithium secondary battery were obtained in the same manner as in Example 1 except that an Li-Ag-Te type alloy having an atomic ratio of Li:Ag:Te=90:10:5 was used.

Comparative Example 2

A negative electrode tape and a lithium secondary battery were obtained in the same manner as in Example 1 except that an Li-Ag type alloy having an atomic ratio of Li:Ag=95:10 was used.

Comparative Example 3

A negative electrode tape and a lithium secondary battery were obtained in the same manner as in Example 1 except that an Li-Ag-Te type alloy having an atomic ratio of Li:Ag:Te=95:5:5 was used.

Comparative Example 4

A negative electrode tape and a lithium secondary battery were obtained in the same manner as in Example 1 except that an Li-Ag type alloy having an atomic ratio of Li:Ag=95:5 was used.

Comparative Example 5

A negative electrode tape and a lithium secondary battery were obtained in the same manner as in Example 1 except that an Li-Ag-Te type alloy having an atomic ratio of Li:Ag:Te=85:15:5 was used.

Comparative Example 6

A negative electrode tape and a lithium secondary battery were obtained in the same manner as in Example 1 except that an Li-Ag type alloy having an atomic ratio of Li:Ag=85:15 was used.

Comparative Example 7

A negative electrode tape and a lithium secondary battery were obtained in the same manner as in Example 9 except that an Li-Ag-Te type alloy having an atomic ratio of Li:Ag:Te=90:10:10 was used.

Experimental Example 1

The lithium secondary batteries obtained in the above-mentioned Examples 1–9 and Comparative Examples 1–7 were examined for the retention ratio of discharge capacity after 200 repetitions of charge-discharge cycles using the current of 0.6 mA/cm$^2$ current density at 4.2 V (charge)–2.5 V (discharge, left standing for 1 hour after charging). The results are shown in Table 1.

TABLE 1

| Battery | Alloy composition | Atomic ratio | Retention of discharge capacity (%) |
|---|---|---|---|
| Ex. 1 | Li—Ag—Te | 90:10:1 | 90 |
| Ex. 2 | Li—Ag—Te | 90:10:0.1 | 92 |
| Ex. 3 | Li—Ag—Te | 90:10:0.01 | 95 |
| Ex. 4 | Li—Ag—Te | 95:5:1 | 78 |
| Ex. 5 | Li—Ag—Te | 95:5:0.1 | 85 |
| Ex. 6 | Li—Ag—Te | 95:5:0.01 | 90 |
| Ex. 7 | Li—Ag—Te | 85:15:1 | 82 |
| Ex. 8 | Li—Ag—Te | 85:15:0.01 | 87 |
| Ex. 9 | Li—Ag—Te | 90:10:0.2 | 85 |
| Com. Ex. 1 | Li—Ag—Te | 90:10:5 | 29 |
| Com. Ex. 2 | Li—Ag | 95:10 | 15 |
| Com. Ex. 3 | Li—Ag—Te | 95:5:5 | 22 |
| Com. Ex. 4 | Li—Ag | 95:5 | 13 |
| Com. Ex. 5 | Li—Ag—Te | 85:15:5 | 27 |
| Com. Ex. 6 | Li—Ag | 85:15 | 11 |
| Com. Ex. 7 | Li—Ag—Te | 90:10:10 | 3 |

EXAMPLE 10

Starting materials weighed to have an atomic ratio of Li:Ag:Te=90:10:0.5 were heated at 500° C. under a highly pure Ar atmosphere (dew-point temperature not less than −60° C.) for melting to give an alloy. Starting materials weighed to have an atomic ratio of Si:Fe=10:20 (the ratio relative to the above-mentioned ratio of Li:Ag:Te) were heated at 1400° C. under the same atmosphere for melting to give an alloy. The obtained Si-Fe type alloy was pulverized to −200 mesh and press-bonded to a long copper collector (42 mm width, 10 μm thickness) with a roller. The collector applied with the alloy was heated at 800° C. for 3 hours and used as a negative electrode substrate. The Li-Ag-Te type molten alloy obtained above was kept at 250° C. and the above-mentioned negative electrode substrate was immersed therein. The substrate was drawn such that the thickness of the Li-Ag-Te type alloy layer on the both sides of the substrate became 50–200 μm per layer and cut into 330 mm long pieces to give negative electrode plates.

A thoroughly-kneaded paste containing LiCoO$_2$ (46 parts by weight) as a positive electrode active substance, acetylene black (4 parts by weight) as a conductivity imparting agent, poly(vinylidene fluoride) (1 part by weight) as a binder, and N-methylpyrrolidone (49 parts by weight) was applied on both sides of a long aluminum foil (42 mm width, 10 μm thickness) by the doctor blade method, such that the thickness of one side was 100 μm. The foil was preliminarily dried at 200° C. for 1 minute and press-rolled. The foil was cut into 300 mm long and subjected to main drying in vacuo at 120° C. for 3 hours to give a positive electrode plate.

Propylene carbonate containing water at not more than 20 ppm and 1,2-dimethoxyethane were mixed at a volume ratio of 1:1 and 1 mol/l of lithium perchlorate was dissolved therein to give an electrolyte solution. A 25 μm thick polypropylene film having a porosity of 43% was impregnated with the electrolyte solution to give a separator.

The negative electrode plate and positive electrode plate obtained above were wound with the separator interposed therebetween and housed in an Ni-plated iron battery can to give a size AA lithium secondary battery.

EXAMPLE 11

In the same manner as in Example 10 except that starting materials weighed to have an atomic ratio of In:Zn:Ni=5:10:10 (the ratio relative to Li:Ag:Te), instead of the Si-Fe type alloy used to prepare the negative electrode of Example 10, were heated at 1,000° C. under the same atmosphere for melting to give an alloy, a negative electrode plate and a lithium secondary battery were obtained.

EXAMPLE 12

In the same manner as in Example 10 except that starting materials weighed to have an atomic ratio of Si:Ni=20:10 (the ratio relative to Li:Ag:Te), instead of the Si-Fe type alloy used to prepare the negative electrode of Example 10, were heated at 1,200° C. under the same atmosphere for melting to give an alloy, a negative electrode plate and a lithium secondary battery were obtained.

Comparative Example 8

In the same manner as in Example 10 except that starting materials weighed to have an atomic ratio of Li:Ag=90:10 were heated at 500° C. under the highly pure Ar atmosphere for melting to give an alloy for the negative electrode, a negative electrode plate and a lithium secondary battery were obtained.

Experimental Example 2

The lithium secondary batteries obtained in the above-mentioned Examples 10–12 and Comparative Example 8 were examined for the electromotive force by the two-terminal method. In addition, the above-mentioned lithium secondary batteries were repeatedly charged and discharged using the current at upper limit voltage of 4.2 V and lower limit voltage of 2.7 V. The batteries were examined for energy density and retention ratio of discharge capacity at 50 cycles. The results are shown in Table 2.

TABLE 2

| Battery | Alloy composition | Atomic ratio | Electromotive force (V) | Energy density (Wh/kg)*1 | Discharge capacity retention (%)*2 |
| --- | --- | --- | --- | --- | --- |
| Ex. 10 | Li—Ag—Te—Si—Fe | 90:10:0.5:10:20 | 4.1 | 170 | not less than 95 |
| Ex. 11 | Li—Ag—Te—In—Zn—Ni | 90:10:0.5:5:10:10 | 4.0 | 168 | not less than 95 |
| Ex. 12 | Li—Ag—Te—Si—Ni | 90:10:0.5:20:10 | 4.1 | 175 | not less than 95 |
| Com. Ex. 8 | Li—Ag | 90:10 | 3.9 | 20 | not more than 30 |

Note
*1: Measured after 50 cycles of charge-discharge.
*2: Ratio of discharge capacity after 50 cycles of charge-discharge, to initial capacity.

According to the present invention, a negative electrode, wherein the growth of dendrite is suppressed, charge-discharge capacity is high, energy density is high and degradation due to repetitive charge-discharge is less can be obtained. By the use of the negative electrode obtained in the present invention, a lithium secondary battery superior in charge-discharge cycle life, which has high energy density permitting long-term use, high electromotive force and high charge-discharge capacity, can be produced.

What is claimed is

1. An alloy for a negative electrode of a lithium secondary battery, comprising an Li-Ag-Te alloy having an atomic ratio of Li:Ag:Te=15–120:1–20:0.001–2.

2. An alloy for a negative electrode of a lithium secondary battery, comprising an Li-Ag-Te-(M1–M2) alloy having an atomic ratio of Li:Ag:Te:M1:M2= 15–120:1–20:0.001–2:1–50:1–30 wherein M1 is a 3A–5A group metal and M2 is a transition metal other than Ag.

3. The alloy of claim 2, wherein M1 is at least one member selected from the group consisting of Al, Si, In and Sn.

4. The alloy of claim 2, wherein M2 is at least one member selected from the group consisting of Zn, Fe, Co, Ni, Mn, Mo and W.

5. A lithium secondary battery comprising a negative electrode composed of the alloy of claim 1.

6. A lithium secondary battery comprising a negative electrode composed of the alloy of claim 2.

7. A lithium secondary battery comprising a negative electrode composed of the alloy of claim 3.

8. A lithium secondary battery comprising a negative electrode composed of the alloy of claim 4.

* * * * *